(12) United States Patent
Archer

(10) Patent No.: US 6,473,748 B1
(45) Date of Patent: Oct. 29, 2002

(54) SYSTEM FOR IMPLEMENTING RULES

(75) Inventor: Jack L. Archer, Yorba Linda, CA (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/321,895

(22) Filed: May 28, 1999

Related U.S. Application Data

(60) Provisional application No. 60/098,594, filed on Aug. 31, 1998.

(51) Int. Cl.[7] .............................................. G06F 15/18
(52) U.S. Cl. .............................. 706/45; 706/47; 706/46
(58) Field of Search ........................... 707/104, 103 R; 705/8, 26; 709/203, 208, 310, 320; 379/91; 706/45, 47

(56) References Cited

U.S. PATENT DOCUMENTS

| | | | | |
|---|---|---|---|---|
| 4,958,368 A | * | 9/1990 | Parker | 379/91 |
| 5,457,797 A | * | 10/1995 | Butterworth et al. | 709/320 |
| 5,710,887 A | * | 1/1998 | Chelliah et al. | 705/26 |

(List continued on next page.)

FOREIGN PATENT DOCUMENTS

| | | | | |
|---|---|---|---|---|
| EP | 0387462 A1 | * | 9/1990 | G06F/15/21 |

OTHER PUBLICATIONS

A PowerBuilder–Centric Discussion of Distributed Programmable Objects., Uniting Object–Oriented and Distributed Systems, by Marcia Gulesian & Philip Gulesian (Jul. 1997).*

Distributed objects for business Getting started with the next generation of computing, by Peter Fingar & Jim Stikeleather SunWorld, Apr. 1997.*

Business Objects, by Robert E. Shelton, (Nov. 30, 1995) Open Engineering Inc.*

Executive Information System, Inc. White Paper No. Twelve Enterprise Knowledge Management Modeling and Distributed Knowledge Management Systems, Joseph M. Firestone, PH.D. (Jan. 3, 1999).*

(List continued on next page.)

*Primary Examiner*—Thomas Black
*Assistant Examiner*—Michael B. Holmes

(57) ABSTRACT

A method, system and computer program product for implementing rules. More specifically, a method, system and computer program product for implementing rules is developed by separating business rules from application logic. This architecture effects the implementation of software business rules in a single location, for sharing across software applications as needed. Software business rules are created and maintained by business experts directly, rather than requiring programmers to translate the rules to software code. Thus, programmers are free to concentrate on programming issues and software business rules (new logic, not just new values/ranges) may be added or changes may be made to existing rules without modifying the software applications which use the business rules. Software business rules are written to implement business logic, which does not perform any kind of computer systems manipulation to obtain the data that it works on, nor does it include any logic to manipulate the underlying computer system in general such as memory allocations and network communications, etc. In this architecture, software application logic is a purely computer system operational piece of logic such as, for example, data access, inter-process communications, screen rendering, network communications or data base access, or any type of computer systems manipulation, and is not included in the same physical software module as business logic. Pure application logic, and range checking, are included in software application modules, which are distinct from the software modules which include business logic.

23 Claims, 5 Drawing Sheets

U.S. PATENT DOCUMENTS

| | | | | | |
|---|---|---|---|---|---|
| 5,737,531 | A | * | 4/1998 | Ehley | 709/208 |
| 5,758,351 | A | * | 5/1998 | Gibson et al. | 707/104 |
| 5,784,539 | A | * | 7/1998 | Lenz | 706/45 |
| 5,787,437 | A | * | 7/1998 | Potterveld et al. | 707/103 R |
| 5,881,230 | A | * | 3/1999 | Christensen et al. | 709/203 |
| 5,913,061 | A | * | 6/1999 | Gupta et al. | 709/310 |
| 6,016,477 | A | * | 1/2000 | Ehnebuske et al. | 705/7 |
| 6,041,306 | A | * | 3/2000 | Du et al. | 705/8 |

OTHER PUBLICATIONS

DKMS Brief No. Two: META Group and the Future of Knowledge Management, A META Group Verdicy, Joseph M. Firestone DKMS Brief No. Three: Software Agents in Distributed Knowledge Management Systems, Agents and DKM Architecture (EIS).*

DKMS Brief No. Four: Business Process Engines in Distributed Knowledge Management Systems, Business Process Engines Executive Information Systems, Inc. Basic Concepts of Knowledge Mangement, Jospeph M. Firestone, PH.D. White Paper No. Nine, Jun. 24, 1998.*

Executive Information Systems, Inc. Distributed Knowledge Management Systems (DKMS): The Next Wave in DSS, Joseph M. Firestone, PH.D. White Paper No. Six, Aug. 23, 1997.*

* cited by examiner

SYSTEM FOR IMPLEMENTING RULES

CROSS-REFERENCES TO RELATED APPLICATIONS

This application is related to, and claims the benefit of the earlier filing date of, U.S. Provisional Patent Application Ser. No. 60/098,594, filed Aug. 31, 1998, entitled "Application Management System and System for Implementing Rules," the entirety of which is incorporated herein by reference.

BACKGROUND OF THE INVENTION

1. Field of the Invention

The present invention relates to a method, system and computer program product for implementing rules. The present invention relates more specifically to a method, system and computer program product for implementing rules by separating business rules from application logic.

2. Discussion of the Background

Common Object Request Broker Architecture ("CORBA") is a specification developed by the Object Management Group ("OMG") in 1992 in which software modules communicate with other software modules in other programs, even if the two programs are written in different programming languages and are running on different platforms. A software component is an individual modular software routine that has been compiled and dynamically linked, and is ready for use with other software components and programs. A software component has an intended purpose, which is to perform a specified function or functions. A software application is a collection of software components and an application facilitates the interaction between software components using the underlying communications infrastructure. A software module is a collection of software components and data structures that performs a particular task or implements a particular abstract data type. A software object, in object-oriented programming, is a variable comprising both software routines and data. The variable is treated as a discrete entity. Object-oriented programming is now well-known in patents. For a detailed discussion of basic object-oriented programming terminology, U.S. Pat. No. 5,388,264 is incorporated by reference herein.

A program is a sequence of instructions that can be executed by a computer. A program may include a collection of software modules and/or a collection of software components. A software application is a program designed to assist in the performance of a specific task, for example, word processing, accounting, inventory management, software module management, and network management of software applications. A data element is a single unit of data, for example, a single bit value representing a value of true or false or a numeric value of 0 or 1, a sequence of bits representing a name, a sequence of bits representing a numeric value, or a single unit of data including a combination of data elements. Systems information is data relating to the status of a software and/or hardware computer system, for example, data relating to whether a particular hardware or software component is functional or non-functional, and data relating to static or dynamic interfacing of various hardware and/or software components in a computer system or network. In this context, functional means that the software component is performing its intended function, and non-functional means that the software component is not performing its intended function. In this context, a static interface means an interface between software components that is predetermined on the computer system. In this context, predetermined means determined at the time of compilation of the code involving the software component. In this context, a dynamic interface means an interface between software components that is not determined at the time of compilation.

In a CORBA environment, a program makes a request for services of software modules through an Object Request Broker ("ORB") and thus does not need to know the design and composition of the program which includes the software. In client/server applications, an ORB is an interface to which the client makes a request for service from a software object. The ORB then directs the request to the server hosting the software object and returns the resulting value(s) of the service to the client. In an object-oriented programming environment, a client is defined as a member of a class or group that uses the services of another class or group to which the client is not related by way of inheritance from a common class or group. More generally, a client is a software module that requests a service provided by another software module. The client uses the requested service without having to know any working details about the other software module or the service. In a network environment, a server is defined as a computer or program that responds to commands from a client. A more comprehensive discussion of CORBA may be found in Orfali, Harkey, and Edwards, Instant CORBA, John Wiley and Sons, Inc., 1997. Exemplary U.S. patents relating to, and describing features of, CORBA include U.S. Pat. Nos. 5,724,503; 5,787,437; 5,857,102; and 5,539,909.

In a large enterprise such as a corporation, enterprise computing is the use of computers in a network or series of interconnected networks that generally encompass a variety of different platforms, operating systems, protocols, and network architectures. Middleware is software which is invisible to a user, which takes two or more applications and makes them work seamlessly together. A user can design an ordinary component to provide its regular function, and then insert an appropriate middleware mix when the component is built or created at run time. CORBA is a middleware project which is the product of a consortium called the Object Management Group ("OMG") that includes several hundred companies, representing the entire spectrum of the computer industry. The CORBA object bus defines the design of the resident components and how they communicate with one another. CORBA was designed to allow intelligent components to discover each other and interoperate on an object bus. However, CORBA goes beyond interoperability. CORBA also specifies an extensive set of bus-related services for creating and deleting software objects, accessing them by name, storing them in persistent stores, externalizing their states, and defining ad hoc relationships between them. Interface specifications are written in a neutral Interface Definition Language ("IDL") that defines a component's boundaries, that is, its contractual interfaces with potential clients. Components written to IDL are accessible across languages, tools, operating systems, and networks.

CORBA software objects are components of intelligence that may reside anywhere on a network. They are packaged as binary components which remote clients may access via method invocations. Both the language and compiler used to create server software objects are transparent to clients. Clients have no need to know where the distributed software object resides or on what operating system it executes. The distributed software object may be in the same process or on a machine that sits across a large network. Additionally, clients have no need to know how a server software object is implemented. For example, a server software object may be implemented, for example, as a set of C++ classes, or it may be implemented as a large COBOL program—the client has no need to know the implementation details. The client only needs to know the interface its server software object publishes. The interface then serves as a binding contract between clients and servers.

IDL-specified methods can be written in and invoked from any language that provides CORBA bindings. Examples of such languages include C, C++, Ada and Smalltalk. Programmers interact with CORBA software objects using native language constructs. IDL provides operating system and programming language independent interfaces to all the services and components that reside on a CORBA bus. This allows client and server software objects written in different languages to communicate with one another. OMG IDL is utilized to specify a component's attributes, the parent classes from which the component inherits, the exceptions it raises, the typed events it emits, and the methods its interface supports, including the input and output parameters and their data types. The CORBA IDL allows component providers to specify in a standard definition language the interface infrastructure of the software objects they provide.

The Object Request Broker ("ORB") is the software object bus. It allows software objects to transparently make requests to, and receive responses from, other software objects located locally or remotely. The client is not aware of the mechanisms used to communicate with, activate, or store these server software objects. A CORBA ORB provides a wide variety of distributed middleware services. The ORB allows software objects to discover each other at run time and invoke each other's services. An ORB is much more sophisticated than alternative forms of client-server middleware, including traditional Remote Procedure Calls ("RPCs"), Message-Oriented Middleware, database stored procedures, and peer-to-peer services.

With an RPC, a specific function is called, and data is separate. In contrast, with an ORB, a call is made to a method within a specific software object. Different software object classes may respond to the same method invocation differently, through polymorphism. Since each software object manages its own private instance data, the method is implemented on the specific instance data. Thus, a call reaches a specific software object that controls specific data, and then implements the function in its own class-specific way. In contrast, RPC calls have no specificity—all functions with the same name are implemented the same way.

A server cannot tell the difference between a static or dynamic invocation; they both have the same message semantics. In both cases, the ORB locates a server software object adaptor, transmits the parameters, and transfers control to the software Business personnel address computing issues at the applications level. The primary point of contact with computing systems for the average corporate user is the application, for example, financials, order entry, etc. A typical user is quite content to work without knowing which machine or machines host a particular application, what route the client application takes over a network to connect to a server, and so on.

Generally, software business rules are the policies and procedures of a business captured in executable format. Business logic is the logic involved in implementing the policies and procedures of the business. In this context, business logic includes the assertions, assumptions and operations that define the policies and procedures of the business. Any software code that is not concerned with manipulation of the computing environment (for example, retrieving data from storage, memory allocation, service invocations, etc.) is potentially a business rule. Business rules range in scope from simple validations to complex, multi-step procedures. Rules are always aligned with some aspect of the business (e.g., invoicing, sales, manufacturing), commonly called domains. At the same time, rules are often invoked across business boundaries, for example, a sales application may invoke employee (human resource) rules to calculate a commission. A contemporary enterprise is defined by and encapsulated in its information systems. In effect, company policy manuals are now implemented in business software. The original idea behind publishing policy and procedure of a business was to enforce a consistent implementation across the enterprise. Computerization has not changed this requirement.

In expert systems terminology, a rule is a statement that can be used to verify premises and enable a conclusion to be drawn. A rule-based system is an approach to problem solving based on an "IF this, THEN that" approach that uses a set of rules, a database of information, and a "rule interpreter" to match premises with facts and form a conclusion.

An expert system is a software program that makes decisions or solves problems in a particular field, such as finance or medicine, for example, by using knowledge and analytical rules defined by experts in the field. An expert system uses two components, a knowledge base and an inference engine, to form conclusions. An inference engine, or rules engine, is a processing portion of an expert system that matches input propositions with facts and rules contained in a knowledge base and then derives a conclusion, on which the expert system then acts. A knowledge base is a form of database used in expert systems that contains the accumulated body of knowledge of human specialists in a particular field. The reasoning ability or problem-solving approach that a specialist would use is included in the inference engine.

There are several problems associated with implementing business rules for an enterprise. For example, the human reasoning behind a rule, or the "essence" of the rule, is often changed in transitioning from human-oriented user requirements to actual software code. Another potential problem is that the same logical rules may be implemented in several different software applications in an inconsistent manner. When rules are implemented as software code, the identification of specific business rules within a software application, or across several software applications, is often difficult or impossible. Also, modifying business rules embedded in traditional software applications in response to changing business conditions is difficult, time-consuming, costly and risky.

SUMMARY OF THE INVENTION

Accordingly, an object of this invention is to provide a novel method, system and computer program product for implementing rules. The present invention relates more specifically to a method, system and computer program product for implementing rules, the system including a first software module for executing instructions for software applications having non-business logic and a second software module, which is distinct from the first software module, for executing business logic. More specifically, the present invention relates to a method, system and computer program product for implementing rules, the system including a first group of software modules for executing instructions for software applications having non-business logic and a second group of software modules, which is distinct from the first group of software modules, for executing business logic, wherein software application logic other than business logic is executed only by the first group and software having business logic is executed only by the second group.

The present invention provides an architecture to effect the implementation of software business rules in a single location, for sharing across software applications as needed. This architecture allows for creation and maintenance of software business rules by business experts directly, rather than requiring a "translation to software code" step to be performed by programmers. Thus, programmers are free to concentrate on programming issues, for example, building friendlier user interfaces and writing more efficient code for faster turnaround. Also, software business rules (new logic, not just new values/ranges) may be added or changes may be made to existing rules without modifying the software applications which use the business rules. In this context, software business rules are written to implement business logic. In this context, business logic does not perform any kind of computer systems manipulation to obtain the data that it works on, nor does it include any logic to manipulate the underlying computer system in general such as memory allocations and network communications, etc. In the present architecture, software application logic is a purely computer system operational piece of logic such as, for example, data access, inter-process communications, screen rendering, network communications or data base access, or any type of computer systems manipulation, and is not included in the same physical software module as business logic. Pure application logic, and range checking, are included in software application modules, which are distinct from the software modules which include business logic.

The present invention, which allows for robust use of business rules, is accomplished by encapsulating business rules so that their existence is separate from other application code and the business rules are shareable across all enterprise software applications. A standardized distributed software object infrastructure is employed (for example, CORBA) that can be applied to a wide variety of new or future enterprise computing needs, also preserving the investment in legacy systems.

The present invention allows for parallel development of business rules and application software code. The invention also supports a business expert power-user level interface for business rules development, as opposed to a programmer-level interface. Business experts directly participate in the rules creation and maintenance process. Ideally, this equates to the business expert actually creating and modifying the business rule source without the aid of a programmer. This is accomplished by requiring that creation and maintenance of business rules be wholly separate from application programming, allowing for the modification of rules without requiring the modification of the software application that invokes the business rules. Business rules are grouped into domains, exposed, or accessible to applications, for example, as distributed software object interfaces.

Advantages of the present invention's architecture include support of a distributed software object infrastructure, natural support for "encapsulation," and ease of linking to legacy systems via, for example, CORBA. An inference engine, an embeddable artificial intelligence component, is a key element in isolating business rules from software applications which manipulate the computing environment, providing a user interface for business expert rule development and maintenance, which can be implemented as another service component.

The system can be interface-driven, for example, by using CORBA, so that business rules are exposed via interfaces, thus hiding their complexity from the client. Language independent systems are possible, with interfaces scaled across multiple servers/platforms.

An advantage of using a rules-based architecture is the ability to rapidly locate and change rules without disturbing the actual applications in which they are used. Also, business acumen may be captured and preserved across personnel changes. Business users have a much greater feeling of security, as they can actually read and understand the implementation of specific business rules which are not programmer-code oriented. Systems can be created and modified in parallel, as, for example, two business experts can work on two different business rules simultaneously, with no need for a knowledge of computing generally. For example, the business experts have no need to know technical details concerning, for example, data bases, memory space or network communication. The business experts can simply write the business rules in easily comprehended English terminology to create a rule base, which is a collection of business rules. The business experts can design or modify in parallel with each other and with application programmers who work on the application logic. An example of a commercially available software package which supports business rule creation and modification is Elements Advisor, from Neuron Data.

Another benefit is that, since the business rules are separated from application logic, it is possible to make changes in the application logic, to insert a new business rule, or to modify an existing rule, without stopping execution of the application. Changes may be easily made in either business rules or application logic without fear that the whole system structure will break down, or that the changes will introduce other problems throughout the system.

Another advantage is that the underlying infrastructure is applicable to, and reusable by, new computing paradigms, but is easily extended to legacy systems. Virtually any type of business system is capable of being implemented on the present architecture, for example, invoice processing, sales forecasting, network systems administration, work flow, tax planning, and customer satisfaction tracking. The major benefits of the architecture are that experts may focus on their areas of expertise, costs and risks are reduced, software development is accelerated with increased accuracy, the architecture is capable of implementation with almost any business software, and the system seamlessly uses standard distributed infrastructures.

Platform independence is the ability to execute code on a variety of hardware/operating system combinations without the need for modification. "Write once, run anywhere" is a long sought goal for application development, not truly realized except within the confines of a proprietary development environment such as Forte. For distributed software object applications, there are four areas where underlying variations must be "hidden" in order to make software application code truly portable. These areas are the network, binary executable file formats, user interfaces, or GUIs, and inter-process communications ("IPCs"). In all cases, the best way to maintain platform independence is to invoke the services of some form of middleware that isolates the underlying platform and exposes a common set of APIs for application use. Exemplary distributed technologies available to address this requirement include the Internet, Java, Web browsers, and CORBA and D/COM.

The emergence of the Internet has provided a fairly standardized network platform. Java's virtual machine likewise provides a portable binary file format. Browser software supplies a consistent GUI platform. Finally, specifications such as the Object Management Group's ("OMG") Common Object Request Broker Architecture ("CORBA") or Microsoft's Common Object Model ("COM") provide a standardized IPC mechanism allowing software objects to communicate and make requests of each other across processes or across the network.

In the present architecture, a client makes a request and a server or a service component services that request. In the present architecture, clients make a request for a business service, related to some sort of business process. The request is captured by a software component that can process the request and is related to the business service request, i.e., the capturing software component knows how to handle the request. Unknown to the client, a series of software objects may be activated by the servicing component, wherein some of the software objects are dedicated to the business rule and others are dedicated to any application logic that is required to service the request.

In the present architecture, the business rules are segregated from the application logic in the server. The segregation of the business rules is transparent to the client and it is encapsulated in the service component. The software logic is separated into the two groups discussed above in the service component.

The present architecture is not limited to Web systems. It can be used with a traditional client, as long as it is capable of participating in a distributed object infrastructure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
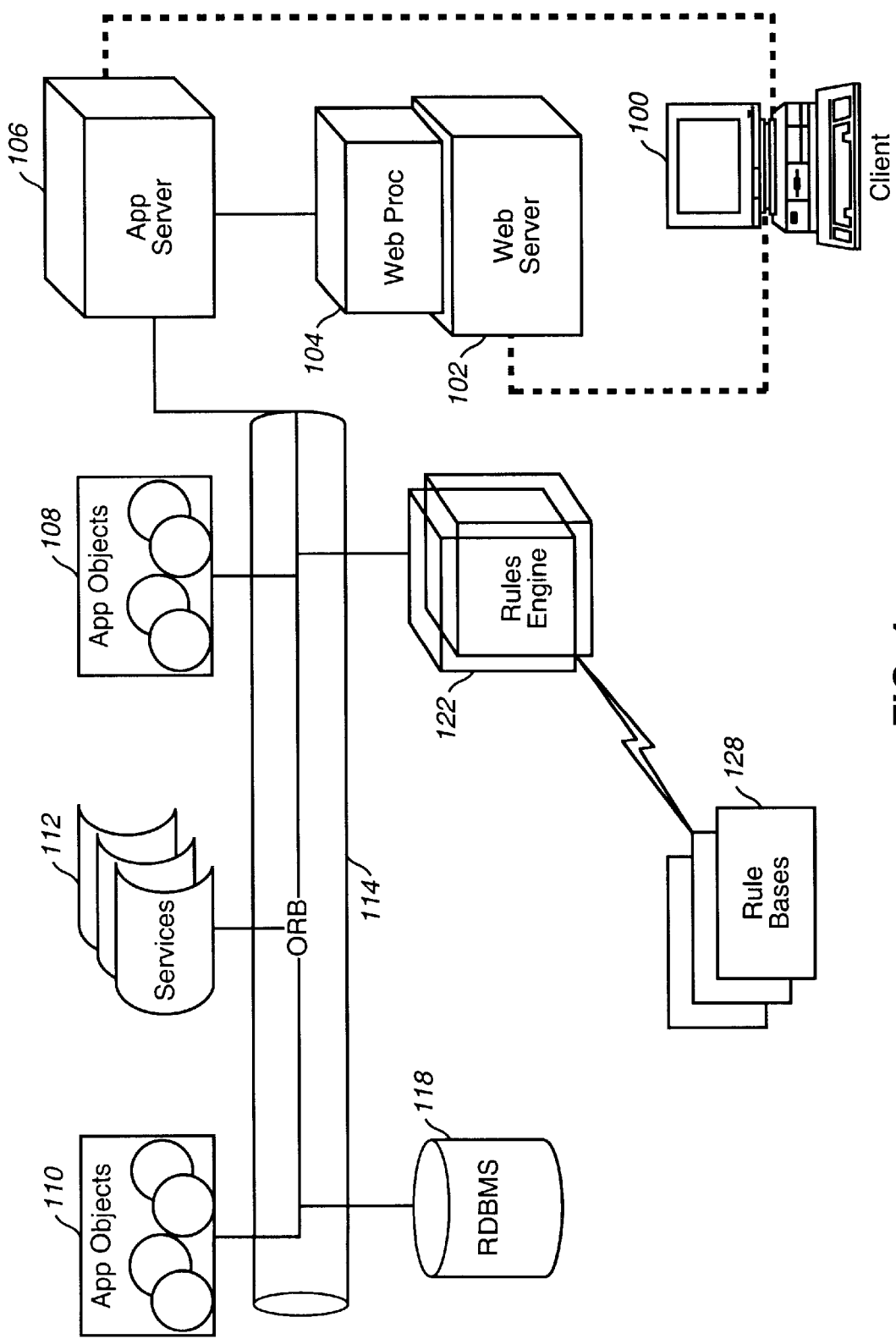
FIG. 1 illustrates a basic rules processing architecture for a Web based client.

Referring now to the drawings, wherein like reference numerals designate identical or corresponding parts throughout the several views, and more particularly to FIG. 1 thereof, there is illustrated a rules processing architecture for a Web based client 100. The client 100 communicates with a Web Server 102, which includes a Web Proc 104. The Web Server 102 communicates with an App Server 106, which communicates with an Object Request Broker ("ORB") 114. The ORB 114 is an interface to which a client makes a request for a software object. The ORB 114 directs the request to a server containing the software object and then returns the resulting values to the client.

Application Software Objects 108 and 110 communicate with the ORB 114 which also communicates with Services 112. The Application Objects 108 and 110 and the Services 112 include software for all application type logic. When an application requires business logic execution, a request is made via the ORB 114 to a Rules Engine 122, which is in communication with Rule Bases 128. Business logic included in the Rule Bases 128 does not perform any kind of computer systems manipulation to obtain the data that it works on. Business logic in the Rule Bases 128 does not include any logic to manipulate the underlying computer system in general such as memory allocations and network communications, etc. Conversely, purely computer system operational logic such as, for example, network communications or data base access, is not included in any software modules for business logic. The ORB 114 is also in communication with a Relational Data Base Management System ("RDBMS") 118. It is to be noted that the logic and execution of the logic for application is kept separate from the logic and application of business rules logic. For example, any input of data or data manipulation would be handled exclusively by the App Objects 108 and 110 and the Services 112, whereas business decision processing would be handled exclusively by the Rules Engine 122.

In order to support the broadest range of clients, for example, traditional clients, Web browsers, etc., the amount of "coupling," or significant connectivity interaction between a client and a server, is kept to a minimum. The end client 100 is buffered from having to establish application server connections by proxy clients that run on the server. For Web-based access, for example, by Web browsers, the Client 100 will only be required to understand and handle HyperText Markup Language ("HTML") and image files. The Client 100 is not expected to perform any client-side processing, for example, via Jave, Active X, or scripting. All manipulation of data stores, for example, all data access is restricted to server-side processing.

Figure 2:
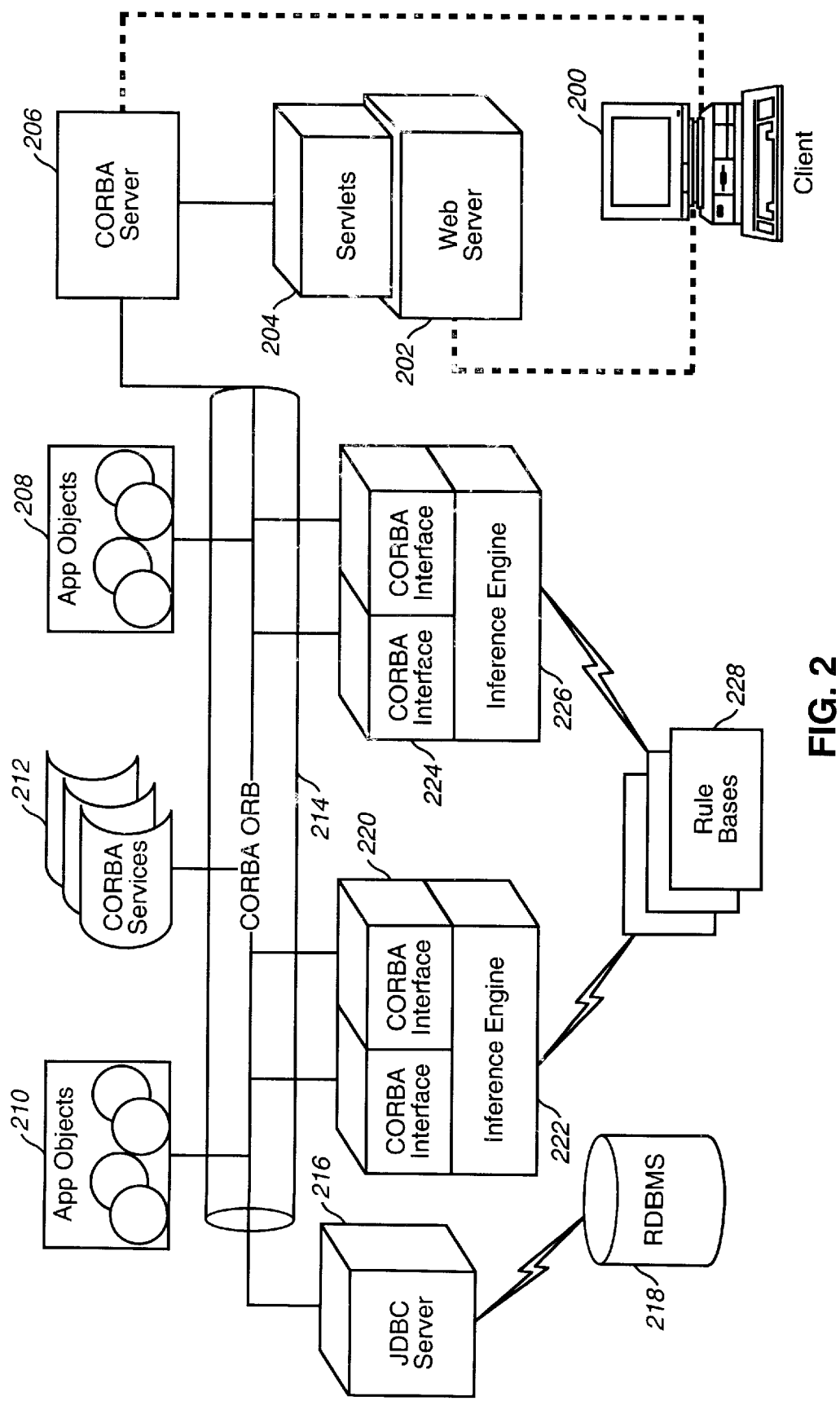
FIG. 2 illustrates a rules processing architecture for a Common Object Request Broker Architecture ("CORBA") environment.

FIG. 2 illustrates a rules processing architecture for Common Object Request Broker Architecture ("CORBA"). A client 200 is in communication with a Web Server 202, which includes Servlets 204. The Web Server 202 communicates with a CORBA Server 206 which communicates with a CORBA ORB 214.

Application software objects 208 and 210 and CORBA Services 212 are in communication with the CORBA ORB 214.

A Java Data Base Connectivity ("JDBC") Server 216, in communication with the CORBA ORB 214, also communicates with a RDBMS 218. CORBA Interfaces 220 and 224 communicate with the CORBA ORB 214. The CORBA Interfaces 220 and 224 communicate, respectively with an Inference Engine 222 and an Inference Engine 226, each of which access a set of Rule Bases 228. It is to be noted that the software related to application logic is included in the Application Objects 208 and 210 and the CORBA Services 212, whereas as business rules and the associated logic are separately included within the Inference Engines 222 and 226, and the Rule Bases 228.

Figure 3:
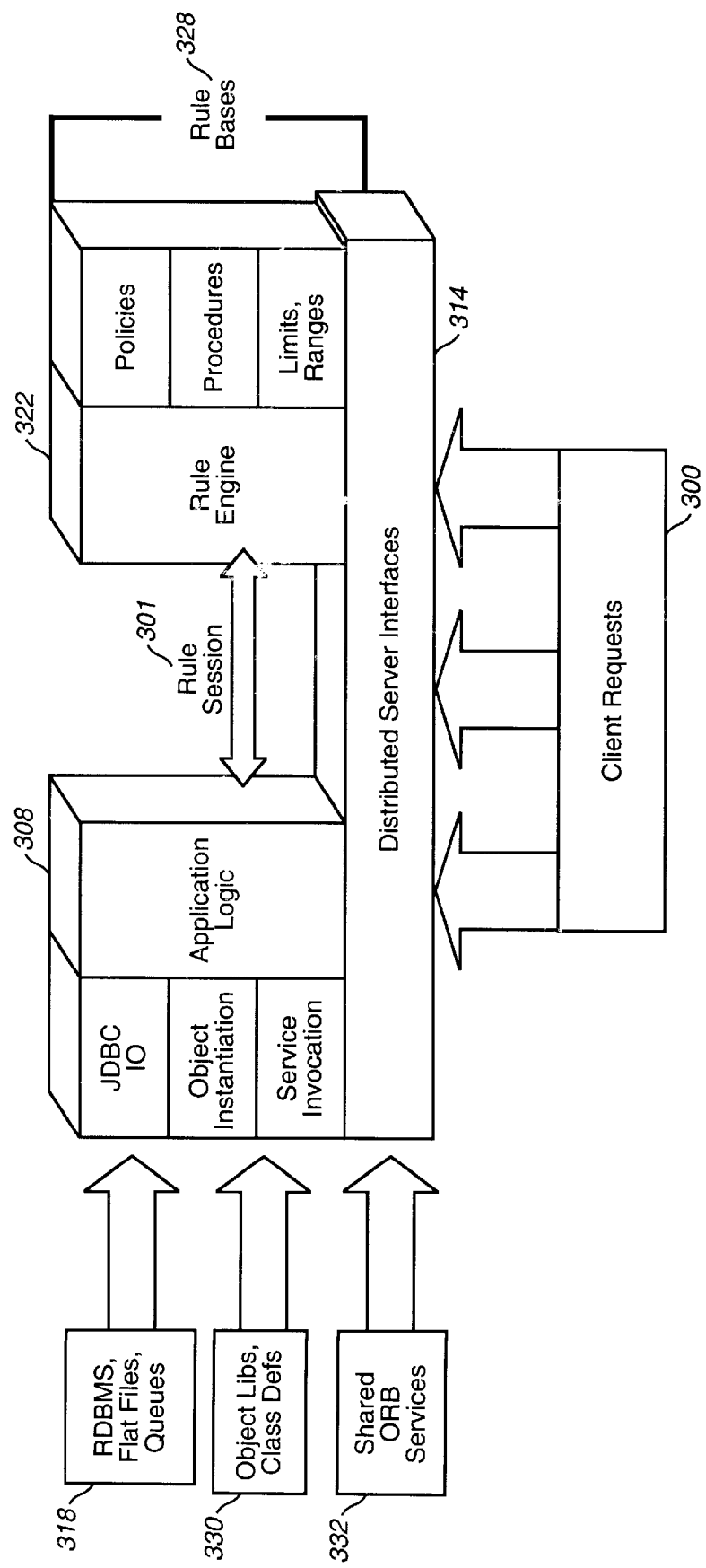
FIG. 3 illustrates a rule processing interface.

FIG. 3 illustrates a rule processing interface. Client Requests 300 are received by Distributed Server Interfaces 314. Application Logic 308, which includes, for example, JDBC Input/Output, software object instantiation and service invocation, communicates with RDBMS, Flat Files and Queues 318, object libraries and class definitions 330, and shared ORB services 332.

When required, the application logic 308 invokes a rule session 301 to obtain service from business rules. A rule engine 322 includes rules for business policies, rules for procedures, and limits and ranges. The logic of the rules is included in rule bases 328. The business rules may take the format of easily understood English conditional statements formulated by a business expert. It is to be noted that the business rules and the processing of the business rules is completely independent of the application logic 308.

Rule domains are implemented using interface definitions. Each interface supports 1-n operations, with each operation fronting a rule session 301, which is a single pass through a rule base 328. In a preferred embodiment, software applications, as part of the application logic 308, invoke the rule session 301 via the standard CORBA interface operation invocation method, i.e., locate an appropriate server and bind to it prior to invoking an interface operation. Each operation, or session, invocation will have its own instances of associated rules bases 328 and data objects, and will execute in its own thread, which is a software process that is part of a larger software process or program. A multi-threaded process can have multiple threads, each executing independently and each executing on separate processors.

The rule session 301 controls access to the rule bases 328. Prior to invoking the inference engine 226, each rule session 301 will, for example, via JDBC, instantiate all persistent software objects required by the rule bases 328 to be executed. This includes any necessary fetching of data from data stores. The rule session 301 will also map the persistent objects to the inference engine 226 processing space, making them available for use by the engine when firing rules, and will instantiate and map any containers/objects necessary to hold the results of a session.

After an inference engine 226 invocation completes, a rule session 301 will retrieve any new software objects from the inference engine 226 processing space and handle them as needed, write any persistent software objects that have been created or modified back to their respective data stores, and reset the inference engine 226, by releasing all data objects, and prepare for the next invocation.

In a preferred embodiment, the client requests 300 are generated by Web browser clients 100 and 200 of FIGS. 1 and 2. It is to be noted that the "thinness" and flexibility of the allowable client yields an architecture which may function in a variety of environments, for example, an intranet, an extended enterprise, etc. The client 100 and 200 of FIGS. 1 and 2 is not limited to "thin" clients. This type of flexibility allows for a broad range of client platforms. Assuming the primary client 100 or 200 to be a standard Web browser with minimal processing power, servlets 204 of FIG. 2 act as proxy clients, hiding all interaction with the CORBA servers 206. CORBA interfaces are invoked as required by the servlet 204 using standard arguments passed from standard browser HTML data streams.

Multiple servlets 204 are invoked on behalf of a single client request—for example, one for creating an HTML response, and another for providing any graphical files, for example, gif files, that may be required. Complex data manipulation, for example, converting raw data to a graph or diagram, is handled by the servlet 204 and passed to the browser client 100 and 200 of FIGS. 1 and 2 as a static image file.

In a preferred embodiment, Java is used to construct all server-side software objects, Just In Time ("JIT") compilers are employed to maximize server performance, a combination of UNIX and NT platforms house the working model, and a type 3 JDBC server configuration supports JDBC access to all databases. This server also controls DB connection pooling. CORBA naming service is used to locate rule interface servers, and CORBA binding is accomplished using both Business Object Architecture ("BOA") and Post Office Architecture ("POA") standards.

As an example, consider an invoicing system. A computer application determines that it is time to gather all invoices that have been received. First it issues a request for invoices to be forwarded to appropriate people. The request for a service for an operation is arbitrated through a series of software components until a service software component is located that can handle the request and respond. At that point, that service software component will process the request and call in order a series of software components to service the request. The service software component first calls an application logic component that requests all of the potential software modules that this request might deal with. In a case of an invoice, it may access a data base and electronically instantiate an invoice, and a copy of the invoice is requested. These are all electronic software versions of real world entities. The entity instantiations are placed in the memory space in the computer ready for use by the business logic. Once all of these entities have been created electronically and placed into memory space in the computer and are ready to be used, the service software component activates the underlying business rule object, and makes a request to apply the rules of the rule base to the entities and waits for the end result to be returned. Once the result is returned, the service software component processes the answer it received from the rule and examines the entities to see if there are any changes. At this point, it selects the changes and may write them back to the database, or it may package them in some other way, and returns a result to the client. The result returned to the client depends upon the operation that was expected by the client. Processing the rules in the rule base does not require any type of data base manipulation, any type of memory manipulation, or any type of application logic. Software modules for processing the rules in the rule base simply apply the business policy and procedures to data. At the end of the processing, when all the rules that apply have been applied, the software modules signal the service software module in control to apply any application software that is necessary to "clean up after the processing," for example, to store any new information, to update any changes to the data in storage, etc., and to reply back to the requesting client.

This architecture can be used for virtually any application for any process that is done today, for example, invoice processing, accounts payroll, weather forecasting, atomic reactor control.

The server that acts as a proxy client. A request initiated by a client may possibly require the server to perform some preprocessing and then initiate the interaction with the service component, so it requests that the computing infrastructure locate a software component that can service the request.

As another example, the client may ask for a commission report, which in computing terms means to produce a commission report for representative xyz. The server takes that end user's request for his commission, translates it into a more formal, more specific service request, using the infrastructure, locates a service component that can meet the request. It then forwards the request to that service component, waits for the answer to be retrieved, formats the answer as needed in an HTML file and forwards the HTML file to the browser for the client.

As another example, consider an on-line department store on the Internet. When a virtual shopper requests a purchase transaction, the system checks the shopper's credit number, to ensure that the shopper can pay for what he/she requests, captures the shopper's address so that the purchase can be shipped to the shopper, etc. Checking the shopper's credit, capturing the shopper's address, and ensuring that the shopper has selected the correct information for the object that he/she wants to buy are all business projects, or business operations. As a user or client, the shopper views a page with a pretty picture on it, the page likely having a button bearing the text "buy," and likely having blanks for filling in the shopper's name and credit card number. That business information is transmitted over the Internet to a server that is associated with the web browser for the on-line department store. That server then captures all of that information that is transmitted in HTML format and encapsulates it in a formal request to a service component. The server is configured to know what the service component expects. The web browser has no need to know what the service component expects. When the request is received by the service component, application logic is executed which is separate from business logic. The system, in application logic, stores the fact that this customer has, for example, purchased a sweater, store this customer's credit card number, and an indication that the number was verified. All relevant information from the transaction is stored and a message is transmitted to the customer which communicates, for example, "your purchase request has been accepted and your order will arrive at your address in 2 weeks."

Another example includes a system for sales forecasting.

Figure 4A:
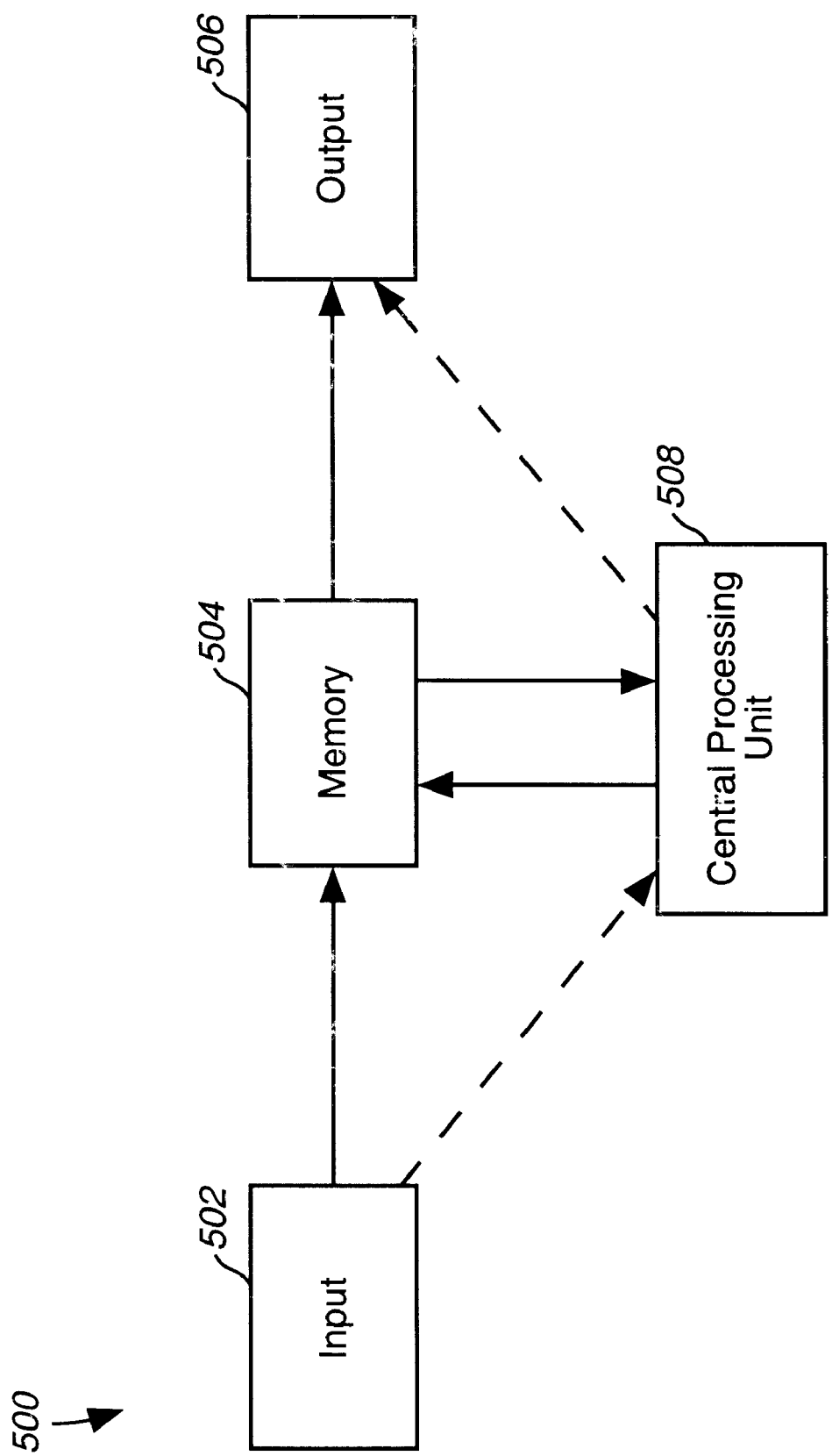
FIG. 4a illustrates an exemplary portion of a generalized computer system upon which portions of the invention may be implemented.

FIG. 4a illustrates an exemplary portion of a generalized computer system 500 upon which portions of the invention may be implemented. For example, the configurations illustrated in FIGS. 1–3 may each be implemented by a plurality of computers having a generalized configuration as exemplified by FIG. 4a or by a plurality of computers having configurations similar to those of FIGS. 4a and 4b described below.

An input 502 of FIG. 4a communicates with a memory 504 and a Central Processing Unit 508. The Central Processing Unit 508 communicates with the memory 504 and an output 506. The output 506 is also in communication with the memory 504. The Central Processing Unit 508 may include an arithmetic/logic unit and a control unit in the form of hardware and/or software (not shown). One or more of inputs 502 may each be in communication with one or more memories 504 and/or Central Processing Units 508. One or more Central Processing Units 508 may be in communication with one or more outputs 506 and/or memories 504 and/or inputs 502. One or more memories 504 may be in communication with one or more inputs 502 and/or Central Processing Units 508 and/or outputs 506. Clearly, a plurality of variations of computer hardware configurations may be realized in a network of computer systems upon which portions of the invention may be implemented.

Figure 4B:
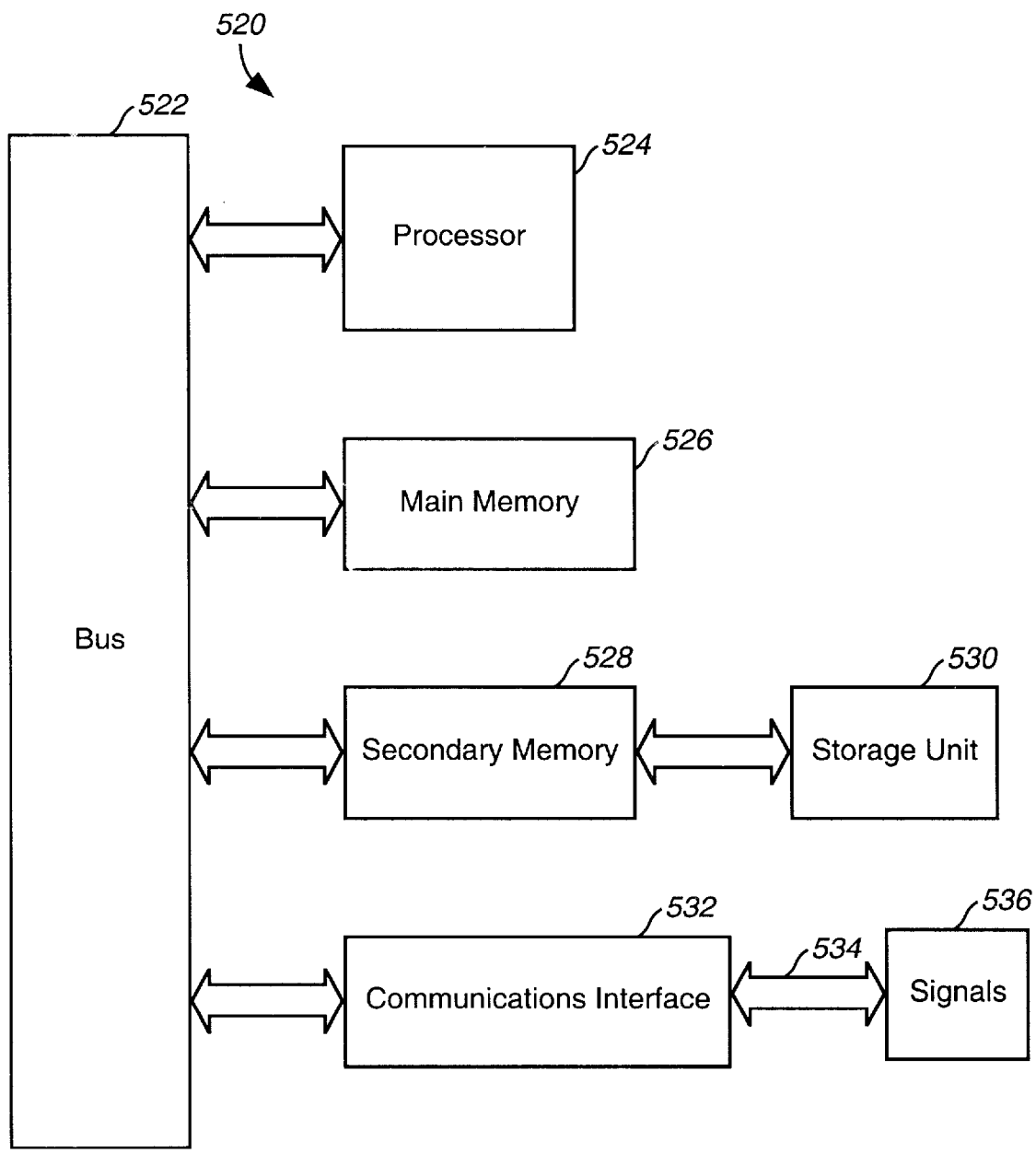
FIG. 4b illustrates an exemplary portion of a generalized hardware configuration, in the format of a workstation, upon which portions of the invention may be implemented.

FIG. 4b illustrates an exemplary hardware configuration of a generalized computer system 520 upon which portions of the invention may be implemented. One or more processors 524 are connected to a communication bus 522. The communication bus 522 also communicates with a main memory 526, preferably a random access memory ("RAM"). A secondary memory 528 communicating with the communication bus 522 may also be included in the computer system 520. The secondary memory 520 may include, for example, a hard disk drive, a removable storage drive such as a floppy disk drive, a magnetic tape drive, an optical disk drive, a program cartridge and cartridge interface, a removable memory chip (e.g., EPROM, PROM, ROM), or any other similar storage medium. The secondary memory 528 may be in communication with a storage unit 530 such as a floppy disk, magnetic tape, optical disk, or other storage medium read by and written to by a secondary memory device. The storage unit 530 includes a computer usable storage medium for storing computer software and data.

The computer system 520 may also include a communications interface 532 in communication with the communication bus 522 for transferring software and data between the computer system 520 and external devices. Examples of communications interfaces 532 include a modem, a network interface (e.g., a network card), a communications port, a PCMCIA slot and card, and other similar interfaces. Software and data transferred via the communications interface 532 are in the form of signals 536 which are provided to the communications interface 532 via a channel 534. The signals 536 may be electronic, electromagnetic, optical or other signals capable of being received by the communications interface 532. The channel 534 may be implemented using wire, cable, fiber optics, a phone line, a cellular phone link, an RF link or other communications channels.

Computer programs are stored in main memory 526 and/or secondary memory 528. Computer programs may be received via the communications interface 532. Computer programs, when executed by the processor 524, enable the computer system 520 to perform the features of the present invention.

This invention may be conveniently implemented using a network of conventional general purpose digital computers and/or microprocessors programmed according to the teachings of the present specification, as will be apparent to those skilled in the computer art from reading the above descriptions regarding FIGS. 1–4b. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer or a plurality of networked computers to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

While this invention has been described in reference to illustrative embodiments, the description is not intended to be construed in a limiting sense. Various modifications and combinations of the illustrative embodiments as well as other embodiments of the invention will become apparent to persons skilled in the art upon reference or description. It is, therefore, intended that the appended claims encompass any such modifications or embodiments.

What is claimed is:

1. An apparatus for implementing rules comprising:

a client;

an application server configured to receive an application data request from the client;

an application object coupled to the application server, the application object configured to service an application object request from the application server;

a rule engine coupled to the application object, the rule engine configured to service a request for executing business-type logic from the application object; and a rule base coupled to the rule engine, the rule base including the business-type logic that does not perform computer systems manipulation on data.

2. The apparatus of claim 1, further comprising an object request broker coupled to the application object, the rule engine, and the application server for directing one or more client requests and returned values.

3. The apparatus of claim 1, further comprising services and other application objects coupled to the object request broker, the services and other application objects including software for executing the application-type logic.

4. The apparatus of claim 3, further comprising a relational data base management system coupled to the object request broker for tracking the application-type logic and the business-type logic.

5. The apparatus of claim 1, further comprising a web server and a web processor coupled to the application server and the client.

6. The apparatus of claim 1, wherein the business-type logic in the rule base includes policies, procedures, limits, and ranges.

7. The apparatus of claim 1, wherein the application object includes an application-type logic for invoking a rule session via on interface operation invocation method.

8. A system for implementing rules comprising:

a client;

an application server configured to receive an application data request from the client;

an application object coupled to the application server, the application object configured to service an application object request from the application server;

inference engines coupled to the application object, each of the inference engines configured to service a request for executing business-type logic from the application object; and a rule base coupled to the inference engines, the rule base includes the business-type logic that does not perform computer systems manipulation on data.

9. The apparatus of claim 8, further comprising an object request broker coupled to the application object, the inference engines, and the application server for directing one or more client requests and returned values.

10. The apparatus of claim 9, further comprising services and other application objects coupled to the object request broker, the services and other application objects including a software for executing the application-type logic.

11. The apparatus of claim 9, further comprising a connectivity server coupled to the object request broker, wherein the connectivity server includes a Java data base.

12. The apparatus of claim 10, further comprising a relational data base management system coupled to the connectivity server for tracking the application-type logic and the business-type logic.

13. The apparatus of claim 8, further comprising a web server and a web processor coupled to the application server and the client.

14. The apparatus of claim 8, wherein the business-type logic in the rule base includes policies, procedures, limits, and ranges.

15. The apparatus of claim 8, wherein the application object includes an application-type logic for invoking a rule session via an interface operation invocation method.

16. A method of implementing rules based on an application data request from a client comprising the steps of:

receiving the application data request from the client by using one or more distributed server interfaces;

processing application data requests through application logic;

invoking a rule session based on a request for executing business-type logic; and processing the business-type logic through a rule engine in communication with a rule base.

17. The method of claim 16, wherein said application logic comprises a java data base connectivity input/output, software object instantiation, and service invocation.

18. The method of claim 16, wherein said rule engine comprises policies, procedures, limits, and ranges.

19. The method of claim 16, wherein the rule session controls access to the rule base, and instantiates software objects as required by the rule base.

20. A computer-readable medium containing instructions for implementing rules, the instructions causing a computer to:

receive an application data request from a client by using one or more distributed server interfaces;

process application data requests through application logic;

invoke a rule session based on a request for executing business-type logic; and process the business-type logic through a rule engine in communication with a rule base.

21. The computer-readable medium of claim 20, wherein said application logic comprises a java data base connectivity input/output, software object instantiation, and service invocation.

22. The computer-readable medium of claim 20, wherein said rule engine comprises policies, procedures, limits, and ranges.

23. The computer-readable medium of claim 20, wherein the rule session controls access to the rule base, and instantiates software objects as required by the rule base.

* * * * *